United States Patent
Riegl et al.

(10) Patent No.: US 10,126,425 B2
(45) Date of Patent: Nov. 13, 2018

(54) DEVICE FOR OBJECT PROTECTION BY MEANS OF LASER SCANNERS

(71) Applicant: RIEGL Laser Measurement Systems GmbH, Horn (AT)

(72) Inventors: Ursula Riegl, Vienna (AT); Johannes Riegl, Trabenreith (AT); Martin Pfennigbauer, Tulln (AT)

(*) Notice: Subject to any disclaimer, the term of this patent is extended or adjusted under 35 U.S.C. 154(b) by 300 days.

(21) Appl. No.: 15/008,656

(22) Filed: Jan. 28, 2016

(65) Prior Publication Data

US 2016/0216373 A1   Jul. 28, 2016

(30) Foreign Application Priority Data

Jan. 28, 2015  (EP) .................................... 15152921

(51) Int. Cl.

| | |
|---|---|
| *G01S 17/42* | (2006.01) |
| *G01S 17/02* | (2006.01) |
| *G01S 7/481* | (2006.01) |
| *G01S 17/66* | (2006.01) |
| *G01S 17/87* | (2006.01) |
| *G01S 17/88* | (2006.01) |
| *G08B 13/181* | (2006.01) |

(52) U.S. Cl.
CPC .......... *G01S 17/026* (2013.01); *G01S 7/4815* (2013.01); *G01S 17/42* (2013.01); *G01S 17/66* (2013.01); *G01S 17/87* (2013.01); *G01S 17/88* (2013.01); *G08B 13/181* (2013.01)

(58) Field of Classification Search
CPC ........ G01S 7/4802; G01S 13/78; G01S 13/86; G01S 17/023; G01S 17/42; G01S 17/58; G01S 17/66; G01S 17/74; G01S 17/89; G01S 7/4811
See application file for complete search history.

(56) References Cited

U.S. PATENT DOCUMENTS

| 5,045,687 A | 9/1991 | Gurner |
|---|---|---|
| 5,365,218 A | 11/1994 | Otto |
| 9,268,013 B2 | 2/2016 | Rieger et al. |
| (Continued) | | |

FOREIGN PATENT DOCUMENTS

| AT | 510296 | 3/2012 |
|---|---|---|
| AT | 511310 | 10/2012 |
| (Continued) | | |

OTHER PUBLICATIONS

Extended European Search Report for Application No. 15152921.1-1812 dated Aug. 4, 2015.

*Primary Examiner* — Luke D Ratcliffe
(74) *Attorney, Agent, or Firm* — Hoffmann & Baron, LLP

(57) ABSTRACT

The present application relates to a device for object protection, including at least two laser scanners, which are configured to each emit a laser beam scanning fan in front of the object and to detect a penetration of the scanning fan by a body by means of a reflection of the laser beam of the scanning fan on the body. The laser scanners are arranged on a ground next to the object and have laser beam scanning fans that are oriented upwardly. At least one of the laser beam scanning fans is oriented upwardly at an incline. The laser beam scanning fans intersect one another and the laser beam scanning fans form a closed scanning hood covering the object.

16 Claims, 6 Drawing Sheets

(56) References Cited

U.S. PATENT DOCUMENTS

2002/0080046 A1* 6/2002 Derringer ............ G08B 13/184
340/945
2004/0233414 A1* 11/2004 Jamieson .............. G01S 7/4802
356/4.01
2015/0212209 A1* 7/2015 Iwasawa .............. G08B 13/187
356/5.01

FOREIGN PATENT DOCUMENTS

| AT | 513402 | 4/2014 |
| EP | 0342037 | 11/1989 |
| EP | 0532976 | 3/1993 |
| EP | 1843176 | 3/2007 |
| EP | 2469297 | 6/2012 |

* cited by examiner

DEVICE FOR OBJECT PROTECTION BY MEANS OF LASER SCANNERS

CROSS-REFERENCE TO RELATED APPLICATION(S)

This application claims priority to European Patent Application No. 15 152 921.1, filed Jan. 28, 2015, the disclosure of which is herein incorporated by reference in its entirety.

FIELD OF THE INVENTION

The present application relates to a device for object protection.

BACKGROUND

Laser scanners that operate in accordance with a propagation time measurement principle are nowadays used in many areas; they determine the propagation time of the laser beam and reflection thereof at a body penetrating the scanning fan in order to conclude the spatial position of the body from this and from the radiation angle of the laser beam. Here, the laser beam is either pulsed or is a modulated continuous laser beam; a laser beam pulse sequence of this type or the modulated continuous laser beam is usually pivoted in terms of its direction by a rotating mirror, whereby the laser beam scanning fan is formed.

For object protection it is known to mount laser scanners of this type on the object itself and/or on posts arranged in front of the object, wherein the scanning fans of said laser scanners are oriented down in a straight line or at an incline relative to the ground. A body, as it penetrates the scanning fan, can thus be detected on account of the reflection of said body; however, devices of this type, if the object to be protected has a very complex outline, require a very high number of laser scanners and of course can be flown over very easily.

A laser monitoring arrangement comprising a laser transmitter that rotates on a mast high above the object to be protected and at the same time emits laser beams downwardly three-dimensionally in the shape of a cone in order to monitor the space around the object for penetrators is known from EP 0 532 976 A1. It goes without saying that in this case only a very low spatial and/or temporal resolution can be obtained, since, in particular in the case of relatively large objects, for example in the case of object protection for power plants, the monitored space is very large. In order to attain an improved resolution, a multiplication of the user laser transmitters is only possible to a very limited extent, however, since with a high number of laser transmitters a correct assignment of the current reflections occurring in any case at the ground is now practically impossible; in addition, the structural outlay for an arrangement of this type comprising a multiplicity of laser transmitters and the mast supporting said transmitters would be very high.

SUMMARY

The object of the present application is to create a device for object protection which also reliably identifies penetrators capable of flying and can be used with simple and quick construction. To this end, the present application provides for a device for object protection, comprising: at least two laser scanners, which are configured to each emit a laser beam scanning fan in front of the object and to detect a penetration of the scanning fan by a body by means of a reflection of the laser beam of the scanning fan on the body; wherein the laser scanners are arranged on a ground next to the object and have laser beam scanning fans that are oriented upwardly; wherein at least one of the laser beam scanning fans is oriented upwardly at an incline; wherein the laser beam scanning fans intersect one another; and wherein the laser beam scanning fans form a closed scanning hood covering the object. The term "ground" used here in this case also includes any installations installed on the ground, such as supports, pillars, railings, walls, wall crests, etc., on which the laser scanners can be mounted.

Such an arrangement and orientation of the laser scanners around the object can be installed and scaled very easily so as to be adapted to changing conditions. Furthermore, the closed covering of the object to be protected with the aid of the scanning fan in the manner of a protective cloak or a protective hood eradicates the need for a much more complex three-dimensional monitoring of an overall volume comprising a multiplicity of laser beams, and flying, driving and (if shadowing close to the ground is also prevented) bodies walking on the ground are equally reliably detected. Incorrect detections, for example caused by birds or also animals walking on the ground, can be avoided here as known from the prior art (for example on the basis of their body size). Due to a favourable arrangement and orientation of the laser scanners and also due to a suitable selection of the number thereof, any time and spatial resolution can be attained so to speak, without having to take complex structural measures for this purpose.

In order to be able to correctly assign a reflecting body by the laser scanners in that reflections of an earlier emitted laser beam are not wrongly assigned to a laser beam emitted later, the laser scanners are in some embodiments MTA zone-selective laser scanners. MTA zones are determined in the case of a pulse laser by the pulse sequence or in the case of a frequency-modulated continuous laser by the period of the frequency modulation: If the reflection of a laser beam is only detected after the following laser beam, i.e. laser pulse or the same recurring modulation frequency, has already been emitted, a plurality of laser beams are therefore in the air at the same time, which is referred to as "multiple-time-around" (MTA), and an MTA zone-selective laser scanner thus correctly assigns this reflection to the laser beam emitted earlier and therefore determines the distance of the reflecting body correctly, whereas a conventional laser scanner would assign each reflection to the respective laser beam emitted directly beforehand and would consequently incorrectly detect the reflecting body as being much closer. The distinction of MTA zones is possible for example by different modulation, polarisation or coding of the laser beams, or with varying pulse distances or modulation rates, as is known for example from documents AT 510 296 B1, AT 511 310 B1 and AT 513 402 B1 from the same applicant.

Optionally, each laser scanner is configured to determine a position of penetration and to only detect a penetration when the determined position lies within a predefined region of its scanning fan, said region being defined by at least one other laser beam scanning fan of the scanning hood. In this way, the region of each scanning fan actually taken into consideration is clearly delimited; incorrect detections, for example of objects flying past outside the scanning hood, are thus masked out. Furthermore, the temporal and spatial resolution of each laser scan or scanning fan thereof can be optimised for example in that, during the scanning, the scanning speed, i.e. the speed of the pivoting, is adapted to the respective size of the region of said laser scan or scanning fan thereof. Here, if MTA zone-selective laser scanners are used, such regions can be defined particularly precisely and flexibly.

In one variant, the predefined regions are stored in a database connected to the laser scanners. The regions can thus be quickly predefined for all laser scanners, for example from a 3D model of the scanning hood, and changes can therefore also be responded to quickly.

In accordance with one embodiment of the present application, further laser scanners are arranged on the ground next to the object and have upwardly oriented further laser beam scanning fans; wherein at least one of the further laser beam scanning fans is oriented upwardly at an incline; wherein the further laser beam scanning fans intersect one another; and wherein the further laser beam scanning fans form a closed further scanning hood covering said scanning hood.

A double-covering scanning hood is thus formed so to speak, for example in order to use a penetration of the covering further scanning hood for a pre-warning, before the scanning hood is penetrated, and to trigger a warning or an alarm only in the event of the subsequent penetration of the scanning hood itself. The reliability of the device is thus also increased by redundancy, and the likelihood of false alarms is reduced.

In order to have the same processes between pre-warning and warning, irrespectively of the location of the penetration of the scanning hoods, the further scanning hood can be arranged around the scanning hood at approximately constant distance therefrom.

Alternatively, the scanning hood and the further scanning hood may have approximately the same width but different heights. In this case the respective laser scanners of the different scanning hoods can be arranged close together and only differently oriented, which reduces the installation outlay.

In one embodiment, the scanning hood and the further scanning hood differ from one another in terms of wavelength ranges of the laser beam scanning fans forming said scanning hood and further scanning hood. In this way, for example, a body constructed using stealth technology can be detected in the event that said body penetrates at least one of the two scanning hoods, since such stealth technology cannot be implemented to the same level of efficacy for two suitably different wavelengths. Furthermore, the laser scanners of at least one of the two scanning hoods can emit visible laser beams, whereby a certain deterring effect is obtained or the fact that a second scanning hood formed from invisible laser beams is provided is hidden.

The device optionally comprises an evaluation unit connected to the laser scanners configured to determine at least one of a direction and a speed of the body on the basis of successive detections in the two scanning hoods. Protective or defensive measures can thus be taken if considered necessary.

In one embodiment, the laser beam scanning fan of at least one of the laser scanners can be tilted between a first, steeper orientation and a second, less steep orientation. Scanning hoods of different size can thus be formed as required.

For this purpose, the device optionally comprises a control unit, which is configured to tilt said laser beam scanning fan into the second orientation following a detection of a penetration of said laser beam scanning fan in the first orientation. In this way a pre-warning and where appropriate a following warning in the event of repeated penetration of the scanning fan in the second orientation is possible in a manner similar to that implemented with two scanning hoods.

Furthermore, the device can comprise an evaluation unit for determining at least one of a direction and a speed of the body on the basis of a detection in the first orientation and a detection in the second orientation. As mentioned further above, targeted subsequent measures can be taken on the basis of a trajectory, determined in this way, of a body penetrating the scanning fan.

In order to further improve the spatial and temporal resolution of the laser scanners of the device, at least one of the scanning hood and the further scanning hood can be formed by first and second laser scanners, wherein the first laser scanners, compared to the second laser scanners, each have a laser beam scanning fan having a smaller fan angle, and wherein the laser beam scanning fans of the second laser scanners each close a gusset remaining between the laser beam scanning fans of two adjacent first laser scanners. In this way, scanning hoods of practically any geometric form can be produced, and the resolution can be optimised in any region of the scanning hood irrespectively of the other regions.

In accordance with a further embodiment, at least one of the laser scanners has a laser beam scanning fan that is curved in the form of a sector of a lateral surface of a cone. In this way, a closed scanning hood covering the object and/or a scanning hood of complex form can be formed with just two laser scanners, wherein the laser scanner sits in the tip of the sector of the lateral surface of a cone so to speak.

Alternatively, each of the laser scanners has a flat scanning fan, wherein each of the scanning hood and further scanning hood is formed by the laser beam scanning fans of at least three laser scanners. This results in laser scanners of simple design; furthermore, a selective arrangement of the laser scanners can be easily provided.

In a further optional variant for covering an elongate object, at least two laser scanners are arranged along each of longitudinal sides of said object. With an arrangement of this type of a suitable number of laser scanners, objects of any longitudinal extension so to speak, for example railway stations or other railway constructions, roads, road sections, aircraft runways, pipelines or the like, can be monitored and/or protected.

BRIEF DESCRIPTION OF THE DRAWINGS

The present application will be explained in greater detail hereinafter on the basis of examples illustrated in the accompanying drawings, in which.

DETAILED DESCRIPTION

Figure 1:
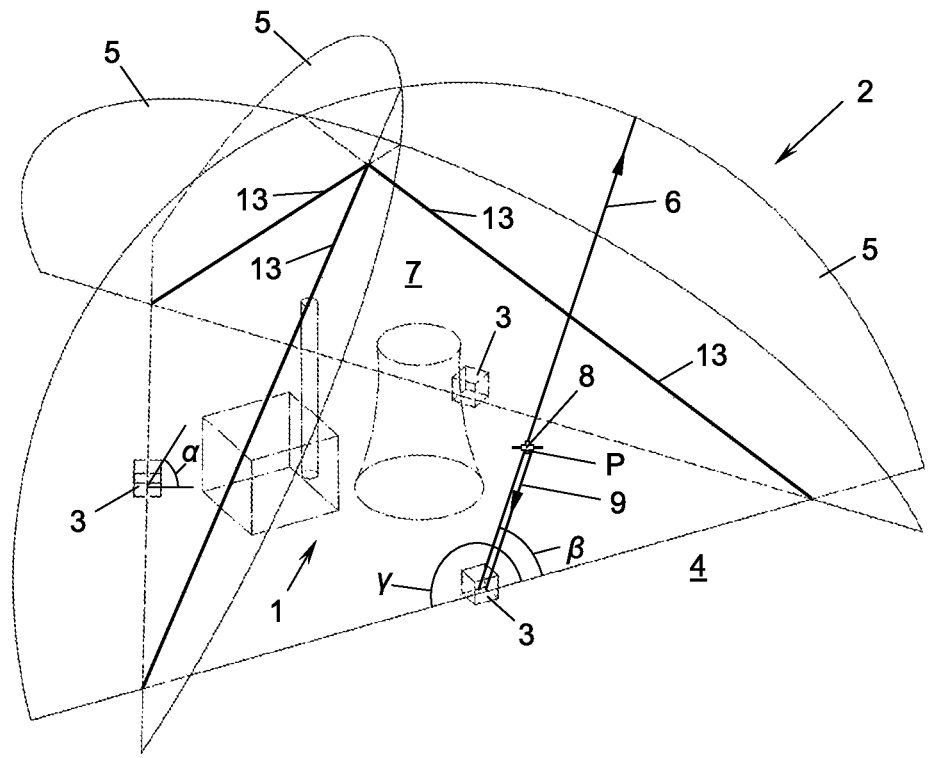
FIGS. 1 to 4, in each case in a perspective oblique view from above, show different embodiments of a device for object protection comprising scanning hoods according to some embodiments formed by three flat laser beam scanning fans each directed upwardly at an incline and intersecting one another (FIG. 1), by three upwardly directed laser beam scanning fans and a laser beam scanning fan directed upwardly at an incline, said laser beam scanning fans intersecting one another (FIG. 2), by a plurality of laser beam scanning fans intersecting one another in a roof-shaped manner (FIG. 3) or by two laser beam scanning fans directed upwardly at an incline, curved in the shape of a sector of the lateral surface of a cone, and intersecting one another (FIG. 4)

In accordance with FIG. 1, an object 1, for example a power plant or the like, is protected with the aid of a device 2, which comprises at least two, in the example of FIG. 1 three, laser scanners 3. The laser scanners 3 are arranged on the ground 4 next to the object 1, around said object, and each emit a laser beam laser beam scanning fan 5 in front of the object 1. Each laser beam scanning fan 5 is generated by continued deflection of emitted laser beams 6, for example by pivoting of a deflection mirror (not shown), as known from the prior art.

In the example of FIG. 1, the laser beam scanning fans 5 of all laser scanners 3 are oriented flat and upwardly at an incline, i.e. they have an angle of inclination $\alpha$ relative to the ground 4 of less than 90°, and the emitted laser beams 6 in the laser beam scanning fan 5 have a radiation angle $\beta$, which varies in the event of the aforementioned pivoting within a fan angle $\gamma$ or approximately 180°, such that each laser scanner 3 scans on both sides as far as the ground 4, for example. It goes without saying that at least some of the laser scanners 3 can be arranged for example on a pillar, a wall crest surrounding the object 1, etc., these subsurfaces being included by the term "ground" in the interests of the present description. Here, the laser beam scanning fans 5 intersect one another and thus form a closed approximately pyramidal scanning hood 7 covering the object 1.

If a body 8, for example a person, a vehicle or according to FIG. 1 an unmanned aerial vehicle, penetrates one of the laser beam scanning fans 5, the laser scanner 3 emitting this laser beam scanning fan 5 thus detects the penetration on the basis of a reflection 9 occurring at the body 8, of a laser beam 6 contacting the body 8. The laser scanner 3, on the basis of the propagation time of the laser beam 6 and its reflection 9 and the radiation angle $\beta$ (in the knowledge of its own position and the angle of inclination $\alpha$), determines the position P of the body 8 at the time of penetration of the laser beam scanning fan 5.

Figure 2:
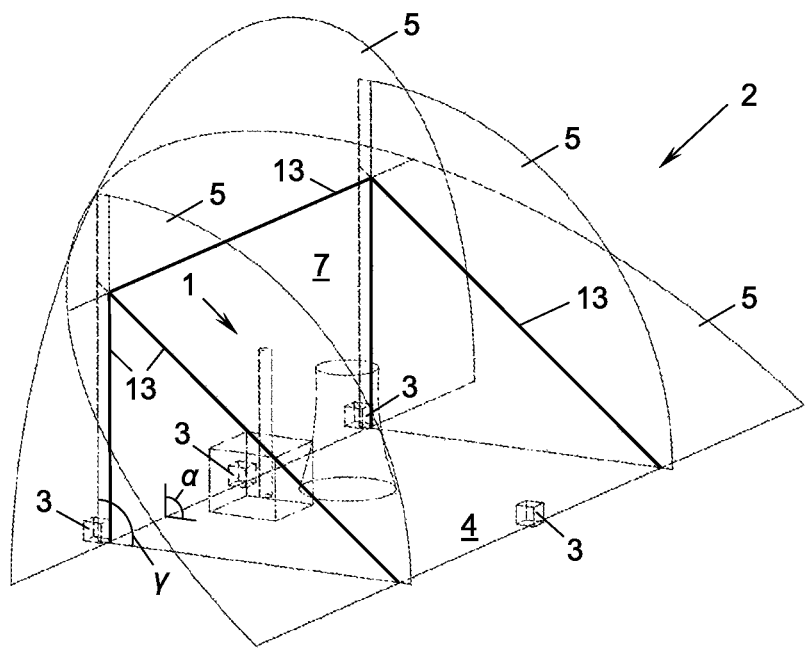
Figure 3:
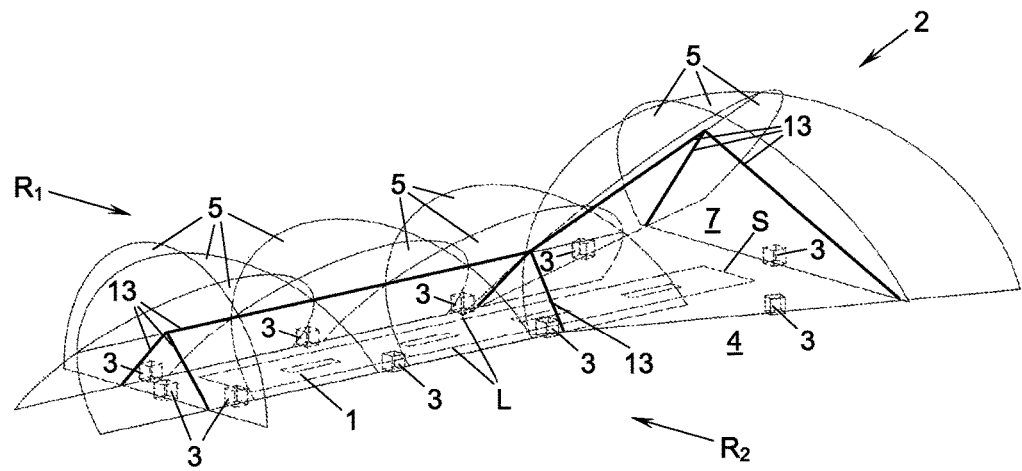
Figure 4:
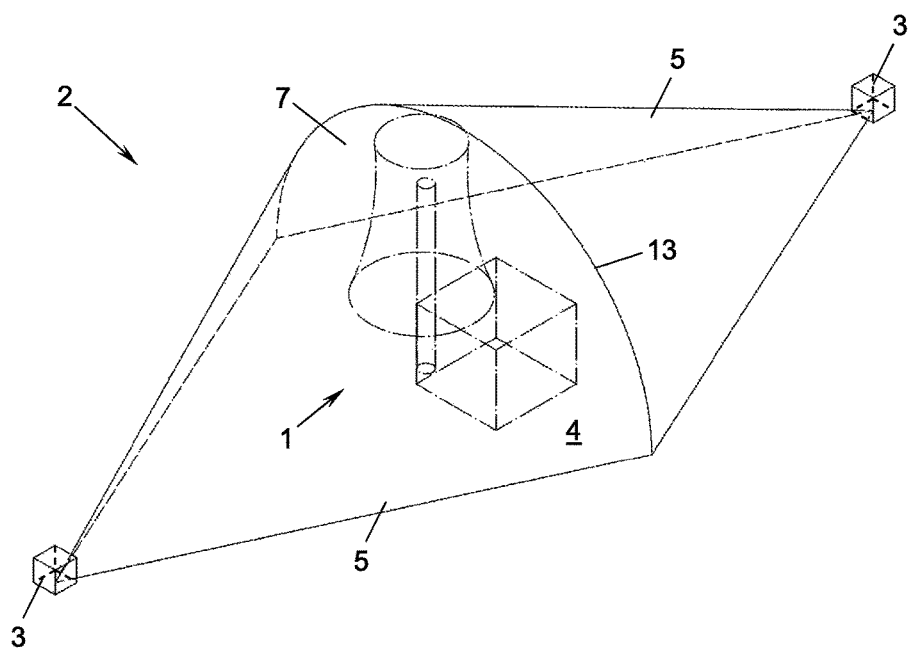

FIGS. 2 to 4 show alternative variants of the device 2 which differ from the example of FIG. 1 by the arrangement and orientation of the laser scanners 3. In accordance with FIG. 2, the laser beam scanning fans 5 of the rear, left and front laser scanners 3 are each approximately straight, upwardly oriented scanning fans, i.e. they have an angle of inclination $\alpha$ of approximately 90°, and only at least one scanning fan 5 (in the example of FIG. 2 the laser beam scanning fan 5 of the right laser scanner 3) has a laser beam scanning fan 5 oriented upwardly at an incline. In addition, in the example of FIG. 2, the fan angles $\gamma$ of the front and rear laser scanners 3 are each limited to approximately 90°. In this way, the laser beam scanning fans 5 in the example of FIG. 2 form a closed scanning hood 7, which covers the object 1 and is here shaped in the form of a tent roof.

The scanning hood 7 of the example of FIG. 3 covers an elongate object 1, for example a railway station or another railway construction, a road or a road section, a bridge or pipeline, etc., in the example of FIG. 3 an aircraft runway. At least two (here: four) laser scanners 3 are arranged for this purpose along each of the longitudinal sides L of the object 1 and thus form two rows $R_1$, $R_2$ of laser scanners 3 parallel to one another. The laser beam scanning fans 5 in one row $R_1$ are here oriented substantially parallel to one another and intersect the laser beam scanning fans of the other row $R_2$, such that an approximately pitched roof-shaped scanning hood 7 is formed, which is closed at each end of the two rows $R_1$, $R_2$ or at the narrow sides S of the object 1 by at least one laser beam scanning fan 5 oriented approximately transversely thereto upwardly or upwardly at an incline.

If desired, laser beam scanning fans 5 may also be pivoted slightly outwardly, for example at least at one end of each row $R_1$, $R_2$, as illustrated in the example of FIG. 3 on the basis of the laser beam scanning fan 5 arranged at the rear, such that the scanning hood 7 is enlarged at this point, for example so as to be able to detect an aircraft that is taking off or landing whilst said aircraft is in the air as well. In this example, an aircraft can be distinguished from other flying objects undesirably penetrating the scanning hood 7, for example on the basis of the known time of penetration for the aircraft or on the basis of the size and/or shape, which is determined by the laser scanners 3 in a known manner, and faulty detections can thus be avoided.

FIG. 4 shows a variant in which at least one laser scanner 3, of which the laser beam scanning fans 5 cover the object 1, has a laser beam scanning fan 5 curved in the form of a sector of a lateral surface of a cone, such that just two laser scanners 3 are sufficient to form the scanning hood 7, which is here dome-shaped. It goes without saying that, in a modification of this example, one of the two laser scanners 3 may have a flat laser beam scanning fan 5 and could here be oriented upwardly at an incline or also straight upwardly and/or the scanning hood 7 can be formed with more than two laser scanners 3.

The examples of FIGS. 1 to 4 show that scanning hoods 7 can be formed from identical or different laser beam scanning fans 5 in a wide variety of shapes going beyond the examples, provided such a scanning hood 7 covers the object 1 in a closed manner.

As is known to a person skilled in the art, pulsed laser beams 6 or frequency-modulated continuous laser beams 6 can be used as laser beams 6.

The detection of the penetration of a laser beam scanning fan 5 formed from pulsed laser beams 6 will be explained hereinafter in greater detail on the basis of FIGS. 5a, 5b and 6, wherein this explanation is valid analogously for frequency-modulated continuous laser beams 6. It is important to remember that the laser beam scanning fans 5 illustrated in FIGS. 1 to 4 and 6 as sectors of a circle are, in reality, not limited in the direction of emission of the laser beams 6, but the received energy of a possible reflection 9 merely decreases with the distance of the reflecting body 8 from the laser scanner 3, such that practically no reflection can be detected at a very large distance.

In order to attain a high temporal and spatial resolution, it is desirable for each laser scanner 3 to emit laser beams 6 in a quick pulse sequence (or high frequency modulation rate). Here, reflections 9 from a body 8 only occur once at least one further laser pulse has been emitted, i.e. if there are a plurality of laser pulses or reflections 9 thereof at the same time in the air between laser scanner 3 and body 8 then reference is made to a "multiple-time-around" situation (MTA situation). Here, for a correct determination of the position P of the body 8, the reflection 9 received from the body is to be assigned to the correct transmitted pulse or emitted laser beam 6, as explained hereinafter.

It is known from the prior art to define 3 'MTA zones' depending on the distance from the laser scanner 3, more specifically an MTA zone 0 (designated in FIG. 6 by 10a), by which a reflection of the last-emitted laser pulse would be received, an MTA zone 1 (designated in FIG. 6 by 10b), by which a reflection of the laser pulse emitted directly therebefore (penultimate laser pulse) would be received, and an MTA zone 2 (designated in FIG. 6 by 10c), by which a reflection of the laser pulse before the penultimate laser pulse would be received, and so on. In order to distinguish between reflections 9 from different MTA zones 0 (10a), 1 (10b), 2 (10c), the successive laser pulses in an emitted laser beam 6 can be modulated or coded differently for example, as is explained for example in patent specifications AT 510 296 B1, AT 511 310 B1 and AT 513 402 B1 from the same applicant.

Figure 5A:
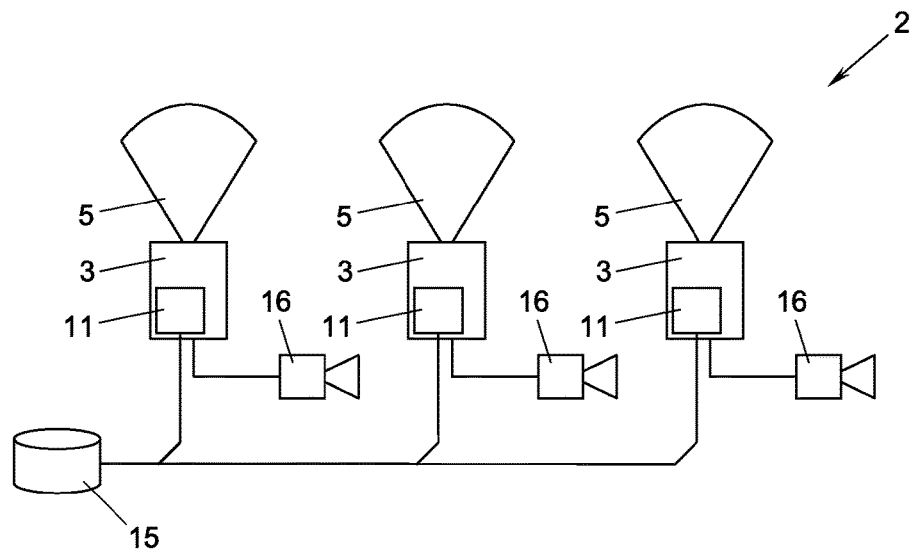
FIGS. 5a and 5b show variants of the devices in accordance with one of FIGS. 1 to 4 in a schematic block diagram.

The laser scanners 3 according to FIG. 5a are accordingly in some embodiments "MTA zone-selective" laser scanners 3, i.e. laser scanners 3 that assign received reflections 9 to the correct MTA zone 0, 1, 2, etc., wherein each of the laser scanners 3 has an MTA selection unit 11. It goes without saying that an MTA zone-selective evaluation can alternatively also be performed in a central evaluation unit 12 according to FIG. 5b, said unit containing the necessary information of the laser scanners 3.

Figure 6:
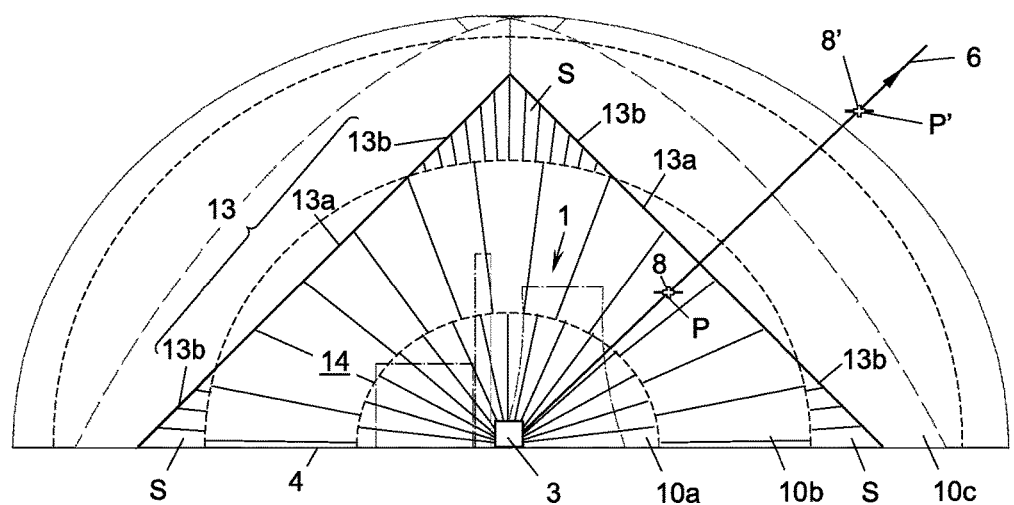
FIG. 6 shows the device of FIG. 1 with defined regions of the laser beam scanning fans in a side view.

In the examples of FIGS. 1 and 6, lines of intersection 13 of the laser beam scanning fans 5 form edges of the scanning hood 7, so to speak. Each of the laser scanners 3 determines the position P of the penetration of its laser beam scanning fan 5 through a body 8, as explained further above, and only detects, if desired, a penetration of the scanning hood 7 when the determined position P lies within a region 14 of the laser beam scanning fan 5 thereof, predefined by the lines of intersection 13, i.e. by the other laser beam scanning fans 5 of the scanning hood 7. In accordance with the example from FIG. 6, the MTA zones 0, 1, 2 or 10a, 10b, 10c lie within the region 14; in this example the innermost MTA zone 10a lies approximately completely within the region 14 in a semi-circular manner, whereas the outwardly adjacent MTA zone 10b is already limited within the region 14 by portions 13a of the line of intersection 13, and the following MTA zone 10c lies within the region 14 as merely approximately triangular segments S between the MTA zone 10b and the remaining portions 13b of the line of intersection 13. Alternatively, however, the entire region 14 could also lie merely in a single MTA zone 10a, for example. Should a laser scanner 3 for a penetration determine a more distanced position P' of a body 8', this penetration or the body 8' is then masked out in this variant and is therefore not detected.

The predefined detection regions 14 of the laser beam scanning fans 5 are here optionally stored in a database 15 connected to the laser scanners 3. Here, the database 15 may contain, for example, a complete 3D model of the scanning hood 7 or merely geometric information for each laser scanner 3 concerning the dimensions of the region 14 defined for said laser scanner.

It goes without saying that, if occasional false alarms caused by bodies 8' flying past the scanning hood 7 are accepted, such a division into regions 14 can be omitted; furthermore, conventional laser scanners 3 instead of the MTA zone-selective laser scanners 3 could also be used (with and without definition of such regions 14), in particular when a low pulse repetition rate is sufficient.

If the penetration of a laser beam scanning fan 3 is detected, information in this regard and/or an alarm is triggered on an output device 16, for example a siren, a screen, etc. Here, in accordance with the example of FIG. 5a, a separate output device 16 can be provided for each laser scanner 3 in order to be able to accurately localise a penetration at least to a certain laser beam scanning fan 5; however, as shown in FIG. 5b, a common output device 16 may also be provided, on which an approximate location specification or where appropriate even the exact position P of the penetration is presented.

Figure 7A:
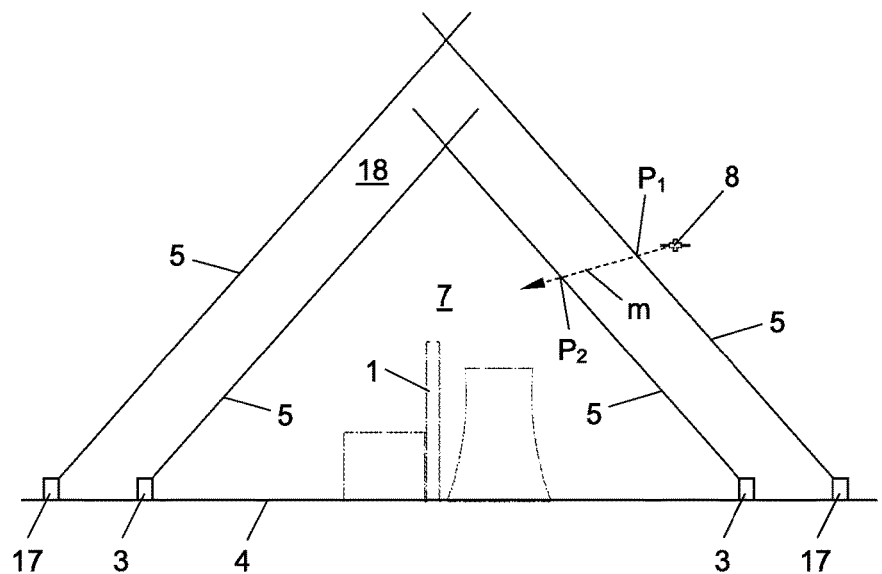
FIGS. 7a and 7b show a development of the device from FIG. 1 with a further scanning hood, which is parallel to that from FIG. 1 (FIG. 7a) or has the same width, but a different height (FIG. 7b), in each case in a cross section.
Figure 7B:
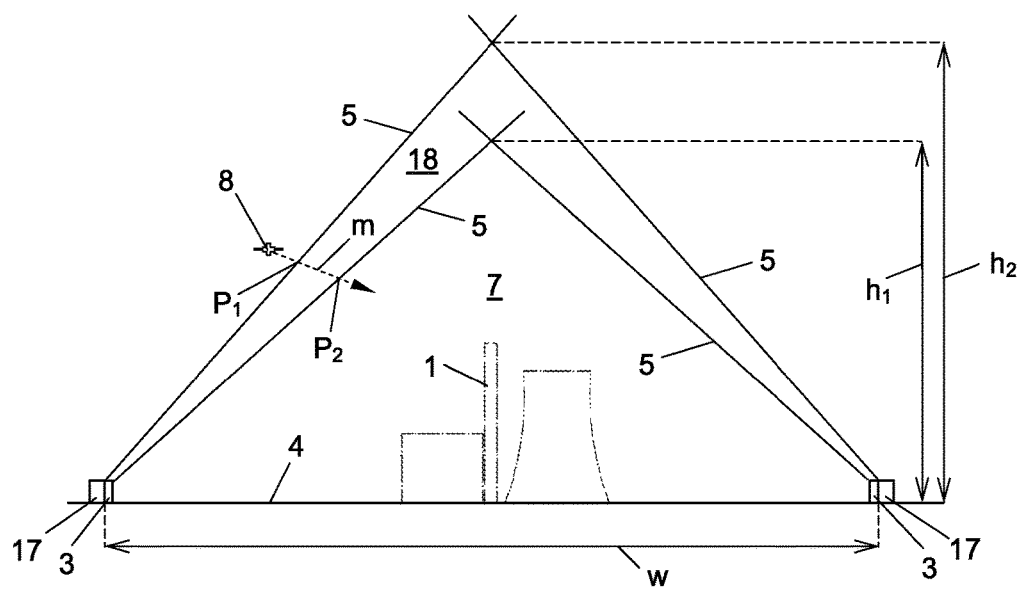

In accordance with FIGS. 7a and 7b, further laser scanners 17 having upwardly oriented laser beam scanning fans 5, at least one of which is inclined upwardly at an incline, which intersect each other, are optionally arranged on the ground 4 next to the object 1, wherein the laser beam scanning fans 5 of the further laser scanners 17 form a closed, further scanning hood 18 covering the aforementioned scanning hood 7. The further scanning hood 18, in accordance with FIG. 7a, can be arranged around the scanning hood 7 at approximately constant distance therefrom; alternatively, the scanning hood 7 and the further scanning hood 18 in accordance with FIG. 7b have approximately the same width w, but different heights $h_1$, $h_2$ or completely different shapes from one another.

If desired, the two scanning hoods 7, 18 can differ from one another in terms of the wavelength ranges of the laser beam scanning fans 5 forming each of said scanning hoods, such that the scanning hood 7 is formed by laser beam scanning fans 5 of a first wavelength range and the further scanning hood 18 is formed by laser beam scanning fans 5 of a second wavelength range, which is different from the first. Here, the wavelength of laser beam scanning fans 5 of a scanning hood 7, 18 may optionally also differ within the respective wavelength range from the wavelength of another laser beam scanning fan 5 of the same scanning hood 7, 18 in order to be able to better assign reflections.

Figure 5B:
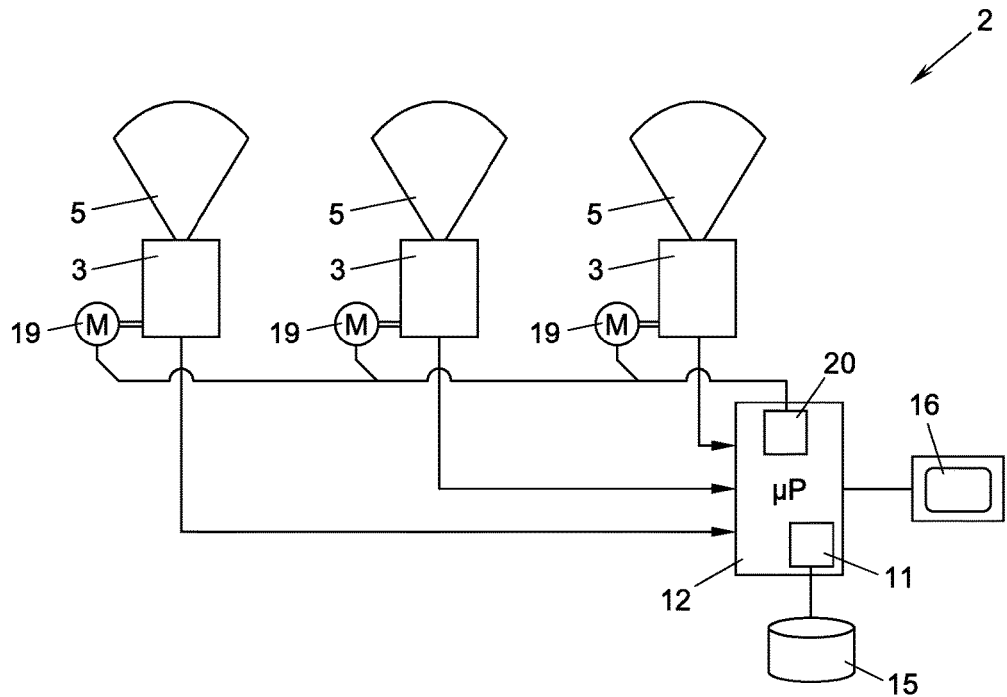
Figure 8:
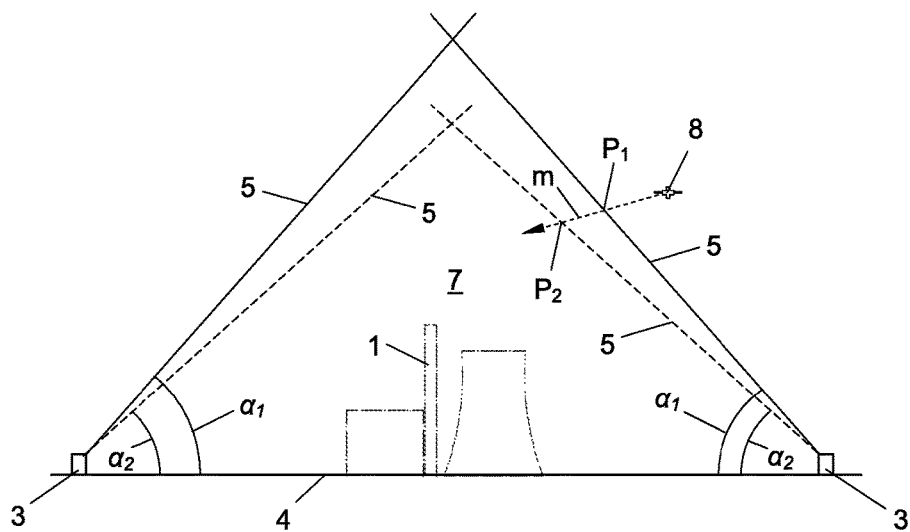
FIG. 8 shows a further variant of the device from FIG. 1 having two tiltable laser beam scanning fans in a cross section.

In accordance with the embodiment of FIG. 8, the laser beam scanning fan 5 of at least one of the laser scanners 3, 17 is optionally tiltable between a first, steeper orientation having an angle of inclination $\alpha_1$ and a second, flatter orientation having a smaller angle of inclination $\alpha_2$, as symbolised in FIG. 5b by the tilt drives 19. The tilt drives 19 are here triggered by a control unit 20 formed for example in the evaluation unit 12, which control unit, following detection of a penetration of the laser beam scanning fan 5 of a laser scanner 3 in the first orientation, tilts this laser scanner in the second orientation. The laser scanner is tilted back, for example, once a predefined period of time has elapsed. The tilting could also be dependent additionally or alternatively on the weather, for example could be performed in conditions of limited visibility, or could be dependent on other factors, for example a general hazard assessment.

It goes without saying that tiltable laser beam scanning fans 5 can be used both with single scanning hoods 7 according to the examples of FIGS. 1 to 4 and with double scanning hoods 7, 18 according to the examples of FIGS. 7a and 7b. Here, if desired, the regions 14 in the database 15 can be adapted to the changed form of the scanning hood(s) 7, 18.

The evaluation unit 12 connected to the laser scanners 3, 17 may optionally determine the direction and/or speed, for example in the form of a movement trajectory m, of a body 8 penetrating the laser beam scanning fans 5 on the basis of successive detections in the two scanning hoods 7, 18 in the examples of FIG. 7a or 7b, or before and after tilting the laser beam scanning fan 5 in the example of FIG. 8, and moreover may do so more accurately, the more accurately are detected the respective positions $P_1$, $P_2$ of the penetration of the two scanning hoods 7, 18 or of the laser beam scanning fan 5 before and after tilting and at the time of the penetration.

Figure 9A:
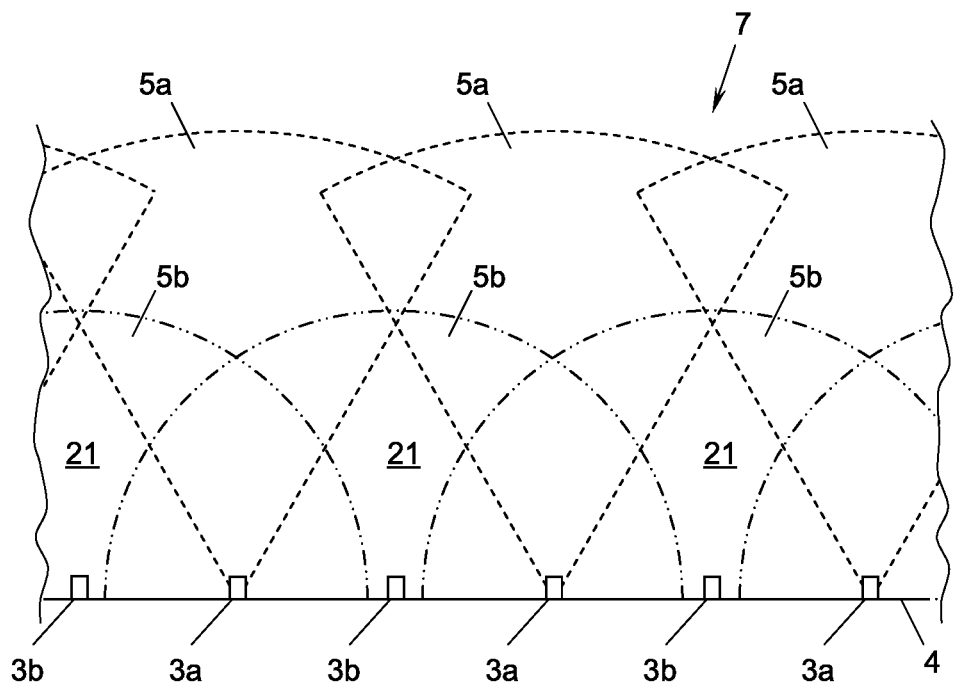
FIGS. 9a and 9b show further variants of the devices according to one of FIGS. 1 to 3 having laser beam scanning fans that can be fanned out to different extents, one without (FIG. 9a) and one with (FIG. 9b) region-dependent position determination, in each case in a simplified two-dimensional illustration.
Figure 9B:
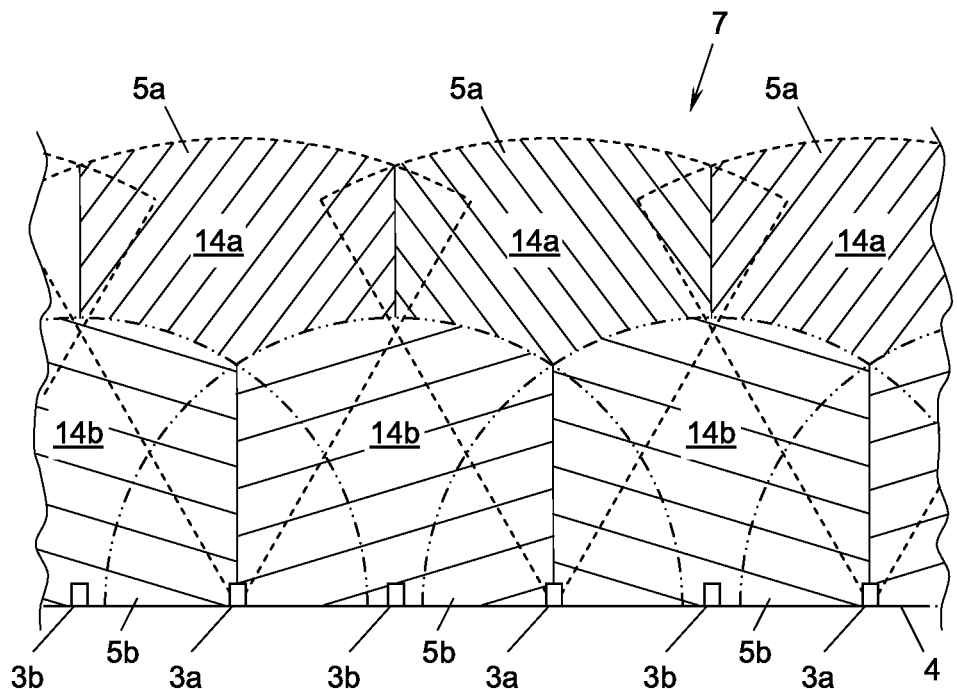

In accordance with the simplified examples illustrated two-dimensionally in FIGS. 9a and 9b, the scanning hood 7 and/or the further scanning hood 18 (described here on the basis of the scanning hood 7), if applicable, is/are formed by first and second laser scanners 3a, 3b, of which the first laser scanners 3a, compared to the second 3b, each have a laser beam scanning fan 5a having a small fan angle γ and the second laser scanners 3b, via their laser beam scanning fans 5b, close gussets 21 remaining between two adjacent first laser scanners 3a (near to the ground in this example). Here, the first laser scanners 3a may also have angles of inclination α different from the second laser scanners 3b. In the two-dimensional illustration of FIGS. 9a and 9b, the upper termination of the scanning hoods 7 and 18 is not shown.

Similarly to that symbolised in FIG. 9b by different areas of hatching, different regions 14a and 14b can also be predefined for the first and second laser beam scanning fans 5a and 5b, in which regions the respective laser scanner 3a, 3b detects a penetration of a body 8. Here, the regions 14a, 14b are in some embodiments of equal area in each respective case so as to be able to attain an approximately identical spatial and time resolution of the respective laser scanners 3a, 3b, the laser scanners 3a, 3b being MTA-selective for this purpose.

The present application is not limited to the presented embodiments, but includes all variants and modifications that fall within the scope of the accompanying claims.

What is claimed is:

1. A device for object protection, comprising:
   at least two laser scanners, which are configured to each emit a laser beam scanning fan in front of the object and to detect a penetration of the scanning fan by a body by means of a reflection of the laser beam of the scanning fan on the body;
   wherein the laser scanners are arranged on a ground next to the object and have laser beam scanning fans that are oriented upwardly;
   wherein at least one of the laser beam scanning fans is oriented upwardly at an incline;
   wherein the laser beam scanning fans intersect one another at respective lines of intersection thereby forming edges of a closed scanning hood covering the object; and
   wherein each laser scanner is configured to determine a position of penetration and to only detect a penetration when the determined position lies within a predefined region of its respective scanning fan, and wherein said predefined region is delimited by a least one of said lines of intersection with another laser beam scanning fan within the closed scanning hood.

2. The device according to claim 1, wherein the laser scanners are multiple-time-around (MTA) zone-selective laser scanners.

3. The device according to claim 1, wherein the predefined regions are stored in a database connected to the laser scanners.

4. The device according to claim 1, wherein further laser scanners are arranged on the ground next to the object and have upwardly oriented further laser beam scanning fans;
   wherein at least one of the further laser beam scanning fans is oriented upwardly at an incline;
   wherein the further laser beam scanning fans intersect one another; and
   wherein the further laser beam scanning fans form a closed further scanning hood covering said scanning hood.

5. The device according to claim 4, wherein the further scanning hood is arranged around the scanning hood at approximately constant distance therefrom.

6. The device according to claim 4, wherein the scanning hood and the further scanning hood have approximately the same width but different heights.

7. The device according to claim 4, wherein the scanning hood and the further scanning hood differ from one another in terms of wavelength ranges of the laser beam scanning fans forming said scanning hood and further scanning hood.

8. The device according to claim 4, wherein the device comprises an evaluation unit connected to the laser scanners configured to determine at least one of a direction and a speed of the body on the basis of successive detections in the two scanning hoods.

9. The device according to claim 1, wherein the laser beam scanning fan of at least one of the laser scanners can be tilted between a first, steeper orientation and a second, less steep orientation.

10. The device according to claim 9, wherein the device comprises a control unit, which is configured to tilt said laser beam scanning fan into the second orientation following a detection of a penetration of said laser beam scanning fan in the first orientation.

11. The device according to claim 10, wherein the device comprises an evaluation unit for determining at least one of a direction and a speed of the body on the basis of a detection in the first orientation and a detection in the second orientation.

12. The device according to claim 1, wherein at least one of the scanning hood and further scanning hood is formed by first and second laser scanners, wherein the first laser scanners, compared to the second laser scanners, each have a laser beam scanning fan having a smaller fan angle, and wherein the laser beam scanning fans of the second laser scanners each close a gusset remaining between the laser beam scanning fans of two adjacent first laser scanners.

13. The device according to claim 1, wherein at least one of the laser scanners has a laser beam scanning fan that is curved in the form of a sector of a lateral surface of a cone.

14. The device according to claim 4, wherein each of the laser scanners has a flat scanning fan, wherein each of the scanning hood and further scanning hood is formed by the laser beam scanning fans of at least three laser scanners.

15. The device according to claim 1, wherein, for covering an elongate object, at least two laser scanners are arranged along each of longitudinal sides of said object.

16. The device according to claim 1, wherein each of the laser scanners has a flat scanning fan, and wherein the scanning hood is formed by the laser beam scanning fans of at least three laser scanners.

* * * * *